United States Patent
Steer

(10) Patent No.: US 11,443,076 B2
(45) Date of Patent: Sep. 13, 2022

(54) DIGITAL CUSTOMIZATION OF PRODUCTS

(71) Applicant: SAP SE, Walldorf (DE)

(72) Inventor: Markus Steer, Baden-Württemberg (DE)

(73) Assignee: SAP SE, Walldorf (DE)

( * ) Notice: Subject to any disclaimer, the term of this patent is extended or adjusted under 35 U.S.C. 154(b) by 952 days.

(21) Appl. No.: 16/210,574

(22) Filed: Dec. 5, 2018

(65) Prior Publication Data

US 2020/0184022 A1  Jun. 11, 2020

(51) Int. Cl.
| | | |
|---|---|---|
| *G06F 30/00* | (2020.01) | |
| *G06T 19/20* | (2011.01) | |
| *G06N 7/00* | (2006.01) | |
| *G06T 17/00* | (2006.01) | |
| *G06F 119/18* | (2020.01) | |

(52) U.S. Cl.
CPC ............ *G06F 30/00* (2020.01); *G06N 7/00* (2013.01); *G06T 17/00* (2013.01); *G06T 19/20* (2013.01); *G06F 2119/18* (2020.01)

(58) Field of Classification Search
CPC ........ G06T 17/00; G06T 19/20; G06F 30/17; G06F 30/27; G06F 2119/18; G06N 7/00; G06N 20/00; G06N 20/20; G06Q 30/0621; G06Q 30/0631; G06Q 30/0633; G06Q 30/0635; G06Q 30/0637
See application file for complete search history.

(56) References Cited

U.S. PATENT DOCUMENTS

| | | | |
|---|---|---|---|
| 7,093,756 B2 | 8/2006 | Muehl et al. | |
| 7,146,239 B2 | 12/2006 | Loeb | |
| 8,908,928 B1 * | 12/2014 | Hansen | G06V 40/103 |
| | | | 382/199 |
| 2012/0030928 A1 | 2/2012 | Park et al. | |
| 2013/0193201 A1 * | 8/2013 | Bradley | G06F 16/23 |
| | | | 705/26.61 |

(Continued)

FOREIGN PATENT DOCUMENTS

| | | |
|---|---|---|
| JP | 2017-226947 A | 12/2017 |
| KR | 101563617 B1 | 10/2015 |
| WO | WO-2017/220638 A1 | 12/2017 |

*Primary Examiner* — Bijan Mapar
(74) *Attorney, Agent, or Firm* — Sterne, Kessler, Goldstein & Fox P.L.L.C.

(57) ABSTRACT

Disclosed herein are system, method, and computer program product embodiments for digitally customizing a product. An embodiment operates by the system generating a three-dimensional model of a portion of a body comprising a custom segment. The system then correlates the custom segment of the three-dimensional body to a corresponding segment of a three-dimensional model of the product using a correlation model unique to the product. The corresponding segment of the three-dimensional model of the product corresponding to a product metric for manufacturing the product. Subsequently, the system determines a difference between the custom segment of the three-dimensional model of the portion of the body and the corresponding segment of the three-dimensional model of the product is. Based on the difference, the system determines an adjusted metric for manufacturing the product. Subsequently, based on the adjusted product metric, the system updates the correlation model unique to the product.

20 Claims, 3 Drawing Sheets

(56) References Cited

U.S. PATENT DOCUMENTS

| | | |
|---|---|---|
| 2014/0277663 A1 | 9/2014 | Gupta et al. |
| 2017/0249783 A1* | 8/2017 | Mach Shepherd ..... G06T 17/20 |
| 2017/0280828 A1* | 10/2017 | Berger .................... A43D 1/02 |
| 2018/0130112 A1* | 5/2018 | Gerson .............. G06Q 30/0643 |
| 2018/0247356 A1* | 8/2018 | Thompson ......... G06Q 30/0621 |

* cited by examiner

DIGITAL CUSTOMIZATION OF PRODUCTS

BACKGROUND

The digital customization of products has become more commonplace. However, digitally customizing products has become increasingly challenging and burdensome. Currently, the digital customization of products is based on personal data inputted by a user. However, this data may not be processed completely accurately during the customization process, nor result in the consumer's intended outcome of the product. Moreover, there are typically interruptions during the customization process that cause issues with orders. These interruptions typically result from issues arising with accurately translating and/or correlating geometry of the consumer's body to determine a best-fitting product (e.g., clothes or sport equipment) for the consumer.

BRIEF DESCRIPTION OF THE DRAWINGS

The accompanying drawings are incorporated herein and form a part of the specification.

In the drawings, like reference numbers generally, indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a single source for accurately, digitally customizing products and determining manufacturing capabilities therefor. As will be described in more detail below, the single source may be provided by a single server, which may be controlled by a single, central entity.

In providing digital customization, the server may receive input from a user relating to a body part and produce a three-dimensional model of the body part based on the received input. Subsequently, the server may correlate the three-dimensional model of the body art to a three-dimensional model of a product using a correlation model unique to the product and determine a custom product metric for manufacturing the product based on the correlation. After the correlation of the three-dimensional model of the body to the three-dimensional model of the product, the server may update the correlation model based on the custom product metric so that a more accurate correlation may be performed for future users. The server may also train and/or improve the correlation model based on previous customer orders. Also after the correlation of the three-dimensional model of body to the three-dimensional model of the product, the server may provide an interface for the user to design the product and may generate a work order and/or a bill of materials for manufacturing centers to produce the customized product.

Accordingly, the server may act as a single source of truth for personalized product configuration and design. In other words, the server may store all information (e.g., correlation models, three-dimensional models) relating a wide range of products so that it may solely provide a digital, interruption free customization process without the assistance of any other external devices (e.g., additional servers). This may result in dramatic simplification in data storage, data updates, and data synchronization As discussed above, the server may provide customization of a wide variety of products that need to be tailored to size and/or geometry of the individual's body segments. Thus, the server may provide customization beyond the examples provided herein.

Figure 1:
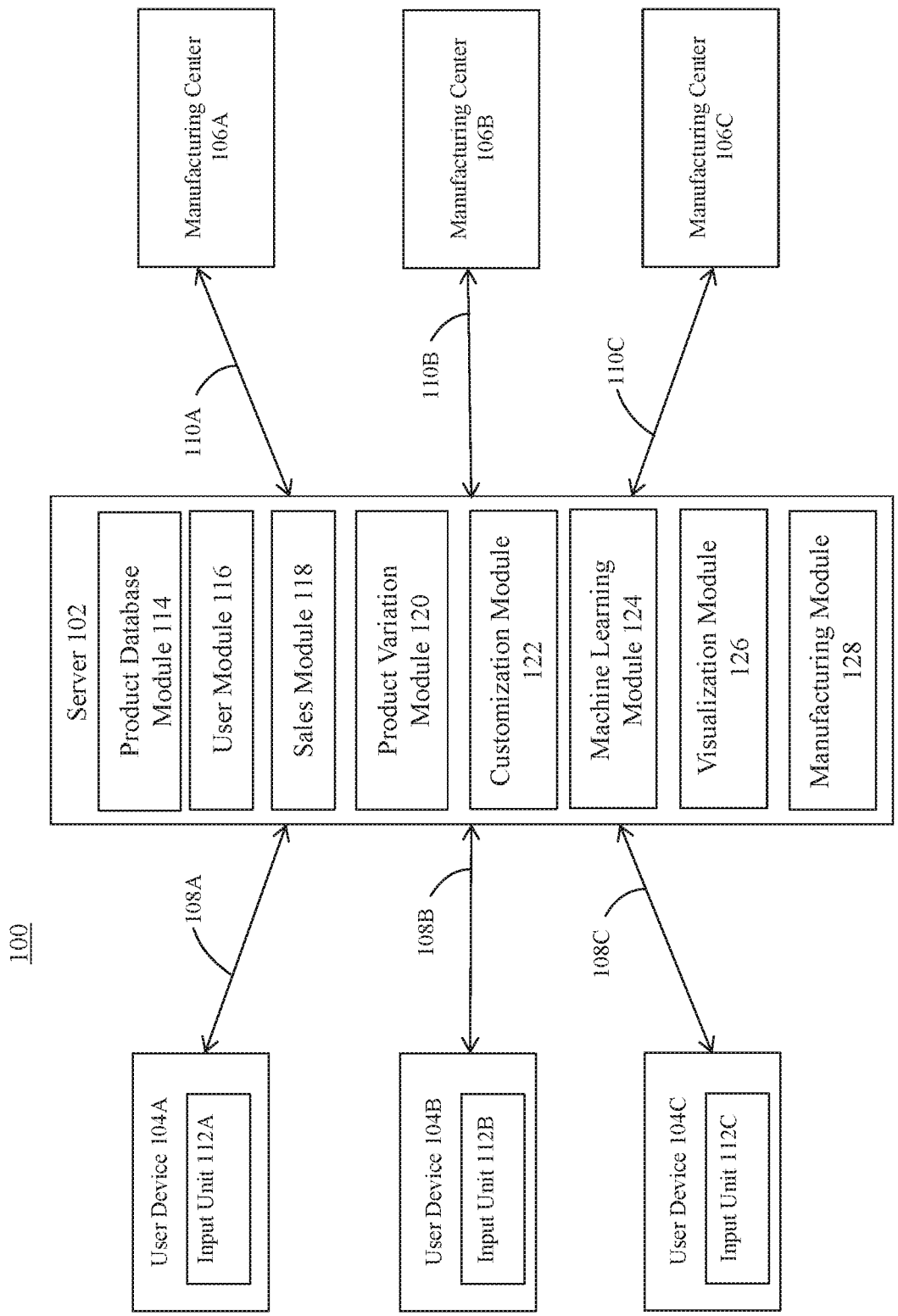
FIG. 1 is a block diagram of a system for digitally customizing products, according to some embodiments.

Referring now to FIG. 1, a block diagram of a system 100 for digitally customizing products is illustrated. The system 100 may comprise a server 102, one or more user devices 104, and/or one or more manufacturing centers 106. The server 102 may be in communication with the user devices 104 over a first communication line 108. The server 102 may also be in communication with the manufacturing centers 106 over a second communication line 110. The first communication line 108 and the second communication line 110 may be private or public. For example, the first communication line 108 may be public, and the second communication line 110 may be private.

The server 102 may be managed by the same or different entity than the manufacturing centers 106. For example, the same entity may manage the server 102 and the manufacturing center 106A, whereas another entity may manage the manufacturing centers 106B, 106C. Conversely, different entities may manage the server 102 and the manufacturing centers 106A, 106B, and 106C. As such, the server 102 may serve as a third party vendor, such as a wholesaler or an independent company.

The user devices 104 may be any type of computing device capable of connecting to the server 102. For example, the user devices 104 may be a smartphone, a mobile phone, a personal computer, a gaming machine, or a video recording device. The user devices 104 may permit a user to customize a particular product. To do so, the user devices 104 may receive input from a user relating to a portion of the user's body. For example, if the product is a shirt, the user devices 104 may receive input from the user relating to their torso. Likewise, if the product is a pair of pants, the user devices 104 may receive input from the user relating to their legs. Along these lines, if the product is a golf club or a bike, the user devices 104 may receive input from body parts, such as a torso, an arm, a pair of legs, a hand, and/or fingers.

Along these lines, the user devices 104 may comprise an input unit 112 to receive the input relating to the portion of the user's body. The input may be two- or three-dimensional. In some embodiments, the input unit 112 may be a scanning unit for scanning a portion of the user's body. The scanning unit may capture pictures of the user's body. To do so, the scanning unit may be a camera (e.g., a still camera or a video camera). Moreover, the input unit 112 may permit the user to manually enter one or more criterion relating to the portion of their body (e.g., weight, height, waist size, chest size, body shape, geometry of the body, arm length, leg length, hand size, foot size.) For example, if the product is a bike, the user input 112 may receive input relating to a height, an inseam, a shoulder width, a thigh, a shin, and an arm length, a sternum height, and/or a foot size of the user. Likewise, if the product is a golf club, the input unit 112 may receive input relating to a distance from a wrist of a user to a floor that the user is standing on, a hand length of the user, a longest finger of the user, an arm length of the user, and/or a torso angle of the user. As such, the input unit 112 may be a keyboard, a mouse, a microphone, and/or a natural language device.

The server 102 may comprise a product database module 114, a user module 116, a sales module 118, a product variation module 120, a customization module 122, a machine learning module 124, a visualization module 126, and a manufacturing module 128. Through the integration of these modules, the server 102 may provide a digital representation of a product that represents the physical manifestation, the 3D virtual model, product metrics, bill of materials, work order activities, and business context of the product, including inception, design, engineering, and production of the product. As will be explained below, the server 102 may provide real-time information on the configuration, condition, current state, and historical data of the product during the customization process.

The product database module 114 may store data relating the manufacturing centers 106. The data relating to the manufacturing centers 106 may include all data sent by manufacturing centers 106 for customization of products as discussed above. Moreover, as will be described in more detail below, the product database module 114 may also store three-dimensional models of various products generated by the visualization module 126 and/or the correlation models of various products generated by the customization module, as will be discussed in more detail below.

The user module 116 may provide a portal to the user to customize products. In doing so, the user module 116 may serve as a point of interaction for the user to customize products. As such, the user module 116 may provide the user with the customization process from beginning to end. For example, the user module 116 may permit a user to log in and to search for products via the sales module 118. The user module 116 may also receive input from the user relating to the user's body, customization of the products (e.g., aspects and/or options of the product as discussed below) and submission of an order for customized products in the sales module 118. As stated above, the input relating to the user's body may be a scan of the body, such as a photo. The user module 116 may also store data relating to the user (e.g., a user profile) and previous three-dimension models of body parts, as will be discussed in more detail below.

The user module 116 may be in communication with the sales module 118. The sales module 118 may process user orders. For example, the sales module 118 may be in communication with the product database module 114 to search for a product inputted by the user in the portal of the user module 116. Along these lines, the sales module 118 may provide aspects relating to the product and/or options for each aspect to the user module 116. The aspects and/or options of the products may or may not be customizable. For example, where the product is a dress shirt, aspects of the dress shirt may include a color, a size, a sleeve length, a shirt length, a cuff type, a chest width, a waist width, and/or a collar size. As such, options for the dress shirt may include different colors, sizes, sleeve lengths, shirt lengths, cuff types, chest widths, waist widths, and/or collar sizes. Likewise, where the product is a golf club, the aspects may include the kind of golf club (e.g. driver, iron, wedge), the shaft material (e.g. iron, carbon), the direction (e.g. left of right hand). After a selection of the product, the sales module 118 may place the product in a temporary working area for the customization process, such as in a shopping cart.

In providing aspects and/or options of the products to the user module 116, the sales module 118 may be in communication with the product variation module 120. The product variation module 120 may be in communication with the manufacturing centers 106 to receive data relating to the products that may be customized. The data may be aspects and/or options of the products as discussed above. In some embodiments, the manufacturing centers 106 may allow users to freestyle such that they have complete control of the customization of the product without any boundaries. Alternatively, the manufacturing centers 106 may provide confines of the aspects and/or options of the products. For example, where the product is a dress shirt, the manufacturing centers 106 may permit multiple aspects of the dress shirt to be customized, such as a color, a size, a sleeve length, a shirt length, a cuff type, a chest width, a waist width, and/or a collar size. The manufacturing centers 106 may indicate that the sleeve length and the chest width are customizable, and that the sleeve length may be between 30 inches and 40 inches and that the chest width may be between 30 inches and 60 inches. Along these lines, the manufacturing centers 106 may further provide the confines of customization for an aspect of the product based on the confines of customization of another aspect of the product. For example, the manufacturing centers 106 may indicate that customization of the sleeve length of the dress shirt is limited based on the chest width of the dress shirt (e.g., dress shirts having a sleeve length of 30 inches to 35 inches may only be manufactured with a chest width of 55 inches to 60 inches). Likewise, the manufacturing center 106 may indicate, for example, the maximum shaft length or lie angle of a golf club and/or the maximum size of a bike.

Moreover, by receiving data from numerous manufacturing centers 106, the product variation module 120 may enable possible selection of various combinations of aspects and/or options, regardless of whether a particular manufacturer can fulfill such an order (e.g., a dress shirt of a specific size). For example, although manufacturing center 106A may not be able to manufacture a product having a particular aspect and/or size (e.g., a dress shirt having a sleeve length of 30 inches to 35 inches and a chest width of 55 inches to 60 inches), manufacturing center 106B may have such capabilities. As such, the product variation module 120 may enable selection of product having different aspects and/or options that are manufactured by different manufacturing centers 106.

Moreover, the sales module 118 may continue to determine the price of the product at every stage of the customization process. For example, for every modification that the user makes in the customization process, the sales module 118 may provide an updated price of the product based on the assumption that the product configuration is technically feasible.

The user module 116 may also be in communication with the customization module 122. The customization module 122 may receive the input of the user's body (e.g., a scan of the body) and create a three-dimensional model of the user's body based on the input which is displayed via the visualization module 126. To do so, the customization module 122 may determine body metrics of the user. The body metrics may be based on the type of product. For example, if the product is a golf club, the body metrics may be height, a distance of a wrist to the floor, a length of a hand, a length of the longest finger, an arm length, and/or a torso angle. Moreover, if the product is a bike, the body metrics may be a weight, an arm length, a forearm, a thigh length, a lower leg length, a torso length, a foot width, a foot length, and/or inseam, Along these lines, to accurately create the three-dimensional model of the user's body, the customization module 122 may detect anchor points of the user's body related to the user's selected product. The anchor points may relate to anatomical landmarks of the user's body, such as an ankle, a knee, a hip, a shoulder, an elbow, and a wrist. For example, if the product is a golf club, the anchor points may be a shoulder, an elbow, and a wrist of the user.

The customization module 122 may be in communication with a visualization module 126 to present a three-dimensional model of the user's body. Specifically, the customization module 122 may send the anchor points to the visualization module 126, and the visualization module 126 may generate the three-dimensional model of the user's body based on the anchor points. The three-dimensional model of the user's body may comprise one or more segments relating to aspects of the product as discussed above, irrespective of whether the aspects are customizable. For example, where the product is a pair of pants, and the user's input is an image of the user's legs, the customization module 122 may detect the ankles and hip of the user and generate segments relating to the length of the user's legs based on the detection of their ankles and hips. For example, where the product is a golf club and the user's input is an image comprised of a torso, arms and legs, the customization module 122 may detect the user's shoulder, wrist and hip of the user and generate segments relating to the length of the user's torso, arms and legs. As such, the three-dimensional model of the user's body may include at least one custom segment unique to the user.

The customization module 122 may then compare the three-dimensional model of the user's body to a predefined three-dimensional model of the product. The predefined three-dimensional model of the product may be based on the product in its current, raw state as held by the manufacturing centers 106. The predefined three-dimensional model of the products may comprise one or more segments. As such, like the segments of the three-dimensional model of the user's body, the segments of the three-dimensional model of the products may refer to aspects of the products, which may or may not be customizable. For example, if the product is a pair of pants, the three-dimensional model of the pair of pants may include segments relating to the length of the pants in their current, raw form. Along these lines, the segments of the three-dimensional model of the product may correspond to the possible custom segments of three-dimensional models of users. For example, per the example above, where the product is a pair of pants, segments of the predefined three-dimensional model of the pants relating to the length of the pants in their current, raw state may correspond to custom segments of the three-dimensional model of the user's body.

In comparing the three-dimensional model of the user's body to the predefined three-dimensional model of the product, the customization module 122 may correlate aspects relating to the custom segments of the three-dimensional model of the user's body to aspects relating to corresponding segments of the predefined three-dimensional model of the product using correlation models. The correlation models may be unique to the product as stored in the product database module 114. As such, each product may have its own correlation model. Moreover, each metric of each product may have its own correlation model.

As such, aspects of the custom segments of the three-dimensional model of the user's body, as well as aspects of the corresponding segments of the predefined three-dimensional model of the product, may be different for each product and/or product metric. For example, if the product is a golf club, the aspects may relate the segment the of the user's arms in the three-dimensional model of the user's body and the product. As such, in this scenario, the aspects may be the height and distance of the user's wrist to the ground, which may be used to determine a shaft length of the golf club. The correlation model may determine the unique difference of these aspects for the individual. For example, the correlation model may determine that the initial shaft length should be adjusted by using standard shaft length plus/minus 0.5 inches per each 10 cm deviation in men's/women's standard height (e.g. men's standard height: 180 cm)

Accordingly, the correlation model may determine a difference between the custom segments of the three-dimensional model of the user's body and the corresponding segments of the three-dimensional model of the product. Based on the difference, the customization module 122 may determine an adjusted metric for modifying the product in its current, raw state at the manufacturer centers 106. The adjusted metric may relate to aspects of the product as described above. As such, in some embodiments, the adjusted metric may relate to a particular aspect for the product to be customized (e.g., size or dimension of the product). For example, an adjusted metric for a pair of pants may relate to an original length of 36 inches having to be manufactured to an adjusted length of 32 inches for a particular user. For example, if the product is a golf club, the shaft length may be calculated specifically for the user based on the correlation rules allowing all sizes even in-between standard shaft lengths.

Moreover, the customization module 122 may update the correlation model in the product database module 114 based on the determination of each adjusted metric of the product. To do so, the customization module 122 may be in communication with a machine learning module 124 to improve the correlation model for future users. The machine learning module 124 may update the correlation model in the product database module 114 based on the correlation between aspects of the custom segments of the three-dimensional model of the user's body and aspects of the corresponding segments of the three-dimensional model of the product. The machine learning module 121 may update the correlation model based on statistical methods, which may be preselected by an administrator.

Along these lines, the correlation model in the product database 114 may be updated at any point of time, such as at preselected times (e.g., daily, weekly, monthly) or a preselected amount of orders (e.g., 1, 2, 5, or 10 orders), based on update rules. In some embodiments, upon submission of an order, the customization module 122 may update the correlation model based on the customized data according to the updated rules. For example, where the product is a golf club, the correlation model may be updated for aspects relating to segments of the user's body that affect a shaft length, a grip diameter, and a lie angle of the golf club based on the corresponding data inputted for the user of the order. This may allow the product database 114 to store more accurate correlation models over time as more data points become available. Along these lines, the proposed product geometry may improve over time and allow for a more accurate recommendation for users.

Furthermore, the user module 116 may also be in communication with a visualization module 126 to provide a modified three-dimensional model of the product based on the adjusted metric. The visualization module 126 may be in communication with the customization module 122 to permit the user to modify, generate and/or visualize the modified three-dimensional model of the product for the user. The visualization module 126 may be any computer-aided design application, such as CADD. Moreover, the modified three-dimensional model of the product may comprise a plurality of segments that correspond to the segments of the predefined three-dimensional model of the product. Thus, the modified three-dimensional model of the product may include at least one customized segment that is based on the adjusted metric and different than a corresponding segment of the predefined three-dimensional model of the product.

The user module 116 may permit the user to customize segments of the modified three-dimensional model of the product, which were or were not previously customized via the adjusted metric of the product. As such, the customization module 122 may permit the user to customize further the customized segment of the modified three-dimensional model of the product that corresponds to the adjusted metric for the product. For example, where the product is a pair of pants, the original length was 36 inches (i.e., original metric) and the adjusted length is 32 inches (i.e., adjusted metric), the user may further modify the length to be 31.5 inches or 32.5 inches. The user may also select a color of the pair of pants (e.g., customization of an aspect different from the adjusted metric). Likewise, where the product is a golf club (e.g., Iron 5) and its original shaft length was 38 inches and/or adjusted by 0.5 inch per each 10 cm deviation in men's standard height of 180 cm), the user may additionally increase/decrease the shaft length per his/her personal preferences With each customized aspect of the product, the user module 116 may provide an updated design of the product in the visualization module 126.

Accordingly, the user module 116 may provide the user with full access to the visualization module 126. In doing so, the user module 116 may provide options to the user for modifying the modified three-dimensional model of the product. As discussed above, this provides with the real-time feasibility of combinations of user-selected aspects of the products based on the boundary conditions provided by the manufacturer centers 106 that are stored in the product variation module 120.

The user module 116 may also permit the user to modify one or more aspects of the product not associated with the segments of the modified three-dimensional model of the product. For example, where the product is a t-shirt, bike or golf club, aspects not associated with the modified three-dimensional model of the product include color and graphics presented thereon. Along these lines, the user module 116 may permit a user to provide a graphical layout of the product. To do so, the user may upload a picture and place the picture onto the product using the visualization module 126. The user may also choose between options for designing the graphical layout (e.g., drawing tools, colors, patterns) in a drawing software component of the visualization module 126.

As discussed earlier, the sales module 118 may update the product in the temporary working area based on the user input received by the user module 116. As such, the sales module 118 may store a current version of the customized product. The current version of the customized product may include a current modified version of the three-dimensional model of the product and any additional aspects of the product not associated with the modified version of the three-dimensional model of the product. The sales module 118 may also update the price of the product based on the current version of the customized product. The sales module 118 may then continually update the price of the product based on the customization of any aspect of the product.

After submission of an order of a customized product, the customization module 122 may trigger the recalculation of the correlation model based on the determination of each adjusted metric of the product as described above. Also, the sales module 118 may send the order to the manufacturing module 128. In doing so, the manufacturing module 128 may receive the product in its original from the product database module 114 and the current version of the customized product from the sales module 118. The manufacturing module 128 may then generate a work order and/or the bill of materials for the manufacturing centers 106 based on the current version of the customized product. The manufacturing module 128 may also determine a specification for manufacturing the product based on the current version of the customized product. The manufacturing module 128 may send the work order, the bill of materials, and/or the specification for manufacturing the product to the manufacturing centers 106.

Figure 2:
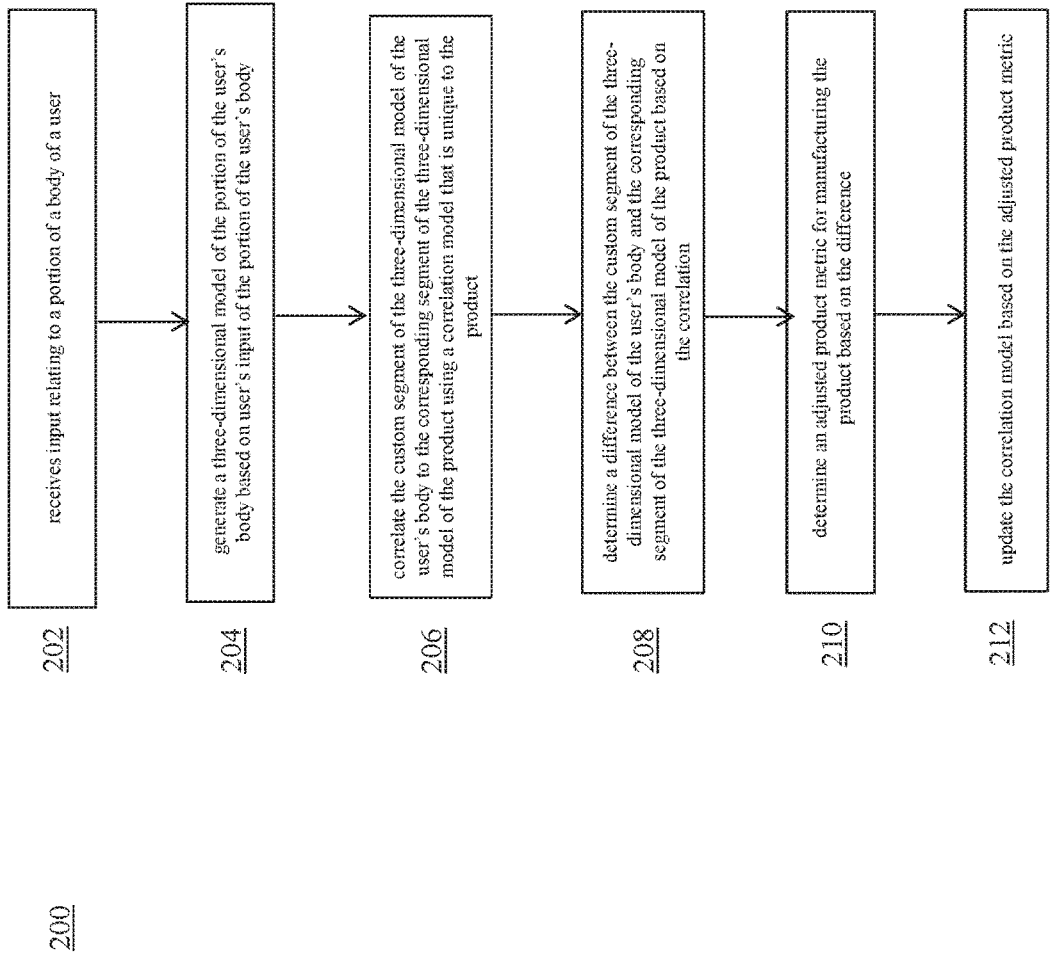
FIG. 2 is a flowchart illustrating a process customizing products, according to some embodiments.

FIG. 2 is a flowchart for a method 200 for digitally customizing products, according to an embodiment. Method 200 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to FIG. 1. However, method 200 is not limited to that example embodiment.

In 202, the system receives input relating to a portion of a user's body. The input may be in a scan of the user's body, such as a series of photos. The portion of the user's body may correspond to a product to be customized. For example, if the product is a pair of pants, the user may scan their legs. For example, if the product is a bike, the user may scan their, body, arms, hands, fingers, and legs.

In 204, the system generates a three-dimensional model of the portion of the user's body based on the user's input of the portion of the user's body. The three-dimensional model of the user's body may comprise a plurality of segments including at least one custom segment. The custom segment may correspond to a particular segment of a plurality of segments of a three-dimensional model of the product. The corresponding segment of the three-dimensional model of the product may correspond to a product metric for manufacturing the product.

In 206, the system correlates the custom segment of the three-dimensional model of the user's body to the corresponding segment of the three-dimensional model of the product using a correlation model that is unique to the product. As such, the system may utilize a correlation model for each type of product or for each product metric for manufacturing the product of each type of product.

In 208, the system determines a difference between the custom segment of the three-dimensional model of the user's body and the corresponding segment of the three-dimensional model of the product based on the correlation. The difference may relate to a degree of customization of the corresponding segment of the three-dimensional model of the product.

In 210, the system determines an adjusted product metric for manufacturing the product based on the difference. For example, where the product is a pair of pants, and the uncut length is 36 inches, the adjusted product metric may be 34 inches. For example, where the product is a golf club, for each 10 cm deviation of men's standard height (180 cm), the shaft length (e.g. Iron 5) may be adjusted by plus/minus 0.5 inch of the standard shaft length (38 inch).

In 212, the system updates the correlation model based on the adjusted product metric. As such, the system may train the correlation model to correlate the custom segment of a three-dimensional model of another user to the corresponding segment of the three-dimensional model of the product based on the adjusted product metric.

Figure 3:
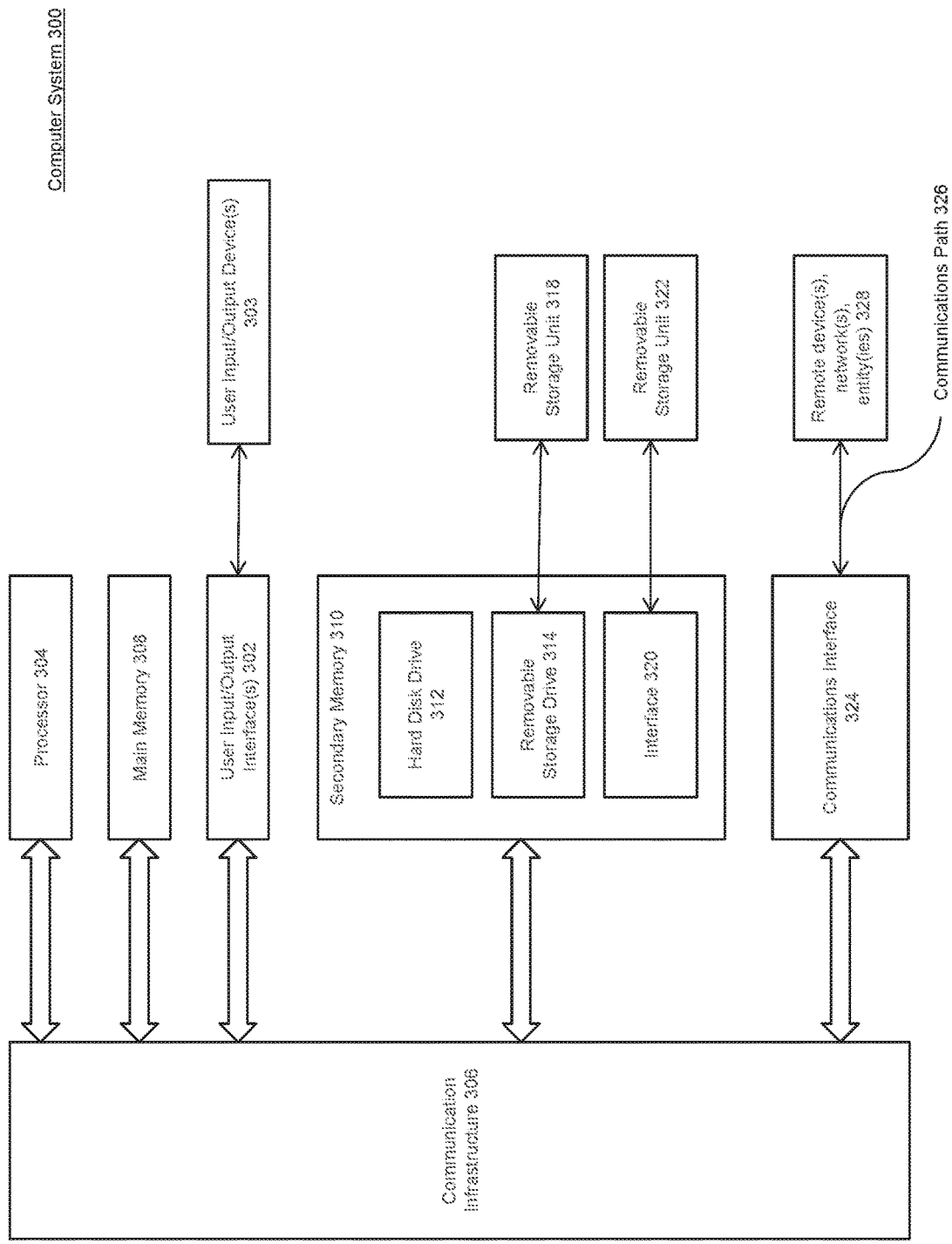
FIG. 3 is an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to the removable storage unit 318.

Secondary memory 310 may include other means, devices, components, instrumentalities or other approaches for allowing computer programs and/or other instructions and/or data to be accessed by computer system 30X). Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smartphone, smartwatch or another wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments may operate with software, hardware, and/or operating system implementations other than those described herein.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A method for digitally customizing a product, comprising:

receiving, by at least one or more processors of a server from a user device coupled to the server, a scan of a body of a user;

determining, by the at least one or more processors of the server, a body metric of the user based on the scan, wherein the body metric is related to a product provided by a manufacturing center;

generating, by the at least one or more processors, a three-dimensional model of at least a portion of the body of the user comprising a first plurality of segments including at least one custom segment unique to the user related to an aspect of the product that is customizable and at least another segment related to an aspect of the product that is not customizable, wherein the three-dimensional model of at least the portion of the body of the user is generated based on one or more anchor points of the body of the user related to the product;

comparing, by the at least one or more processors, the three-dimensional model of at least the portion of the body of the user to a predefined three-dimensional model of the product in a raw state comprising a second plurality of segments including a segment corresponding to the one custom segment of the three-dimensional model of at least the portion of the body of the user, wherein the three-dimensional model of at least the portion of the body of the user is generated by the server, and the predefined three-dimensional model of the product in the raw state is received by the server from a computing device of the manufacturing center;

correlating, by the at least one or more processors, the custom segment of the three-dimensional model of the portion of the body of the user to the corresponding segment of the predefined three-dimensional model of the product in the raw state using a correlation model that is unique to the product;

determining, by the at least one or more processors, a difference between the custom segment of the three-dimensional model of the portion of the body of the user and the corresponding segment of the predefined three-dimensional model of the product in the raw state based on the correlation model;

determining, by the at least one or more processors, an adjusted metric for modifying the product in the raw state;

generating, by the at least one or more processors, a modified three-dimensional model of the product based on the adjusted metric, wherein the modified three-dimensional model of the product is a current modified version of the product;

generating, by the at least one or more processors, a work order for the manufacturing center based on the current modified version of the product; and generating, by the at least one or more processors, an updated price of the product based on the current modified version of the product.

2. The method of claim 1, further comprising:

receiving, by the at least one or more processors, a user input relating to the portion of the body, wherein the generating the three-dimensional model of the portion of the body of the user is based on the user input of the portion of the body.

3. The method of claim 1, the generating the three-dimensional model of the portion of the body of the user further comprising:

detecting the one or more anchor points; and generating the custom segment based on at least two of the one or more anchor points.

4. The method of claim 1, further comprising:

receiving, by the at least one or more processors, data relating to the product from a manufacturer of the product; and determining, by the at least one or more processors, the predefined three-dimensional model of the product in the raw state based on the data relating to the product from the manufacturer of the product.

5. The method of claim 1, wherein the modified three-dimensional model of the product comprises a plurality of segments, and wherein at least one of the plurality of segments of the modified three-dimensional model of the product corresponds to the adjusted metric; and the method further comprises:

presenting, by the at least one or more processors, the modified three-dimensional model of the product to the user.

6. The method of claim 5, further comprising:
receiving, by the at least one or more processors, a modification of the segment of the modified three-dimensional model of the product corresponding to the adjusted metric by the user; and
updating, by the at least one or more processors, the modified three-dimensional model of the product based on the modification of the segment.

7. The method of claim 5, further comprising:
presenting, by the at least one or more processors, a plurality of options for a first aspect of the product to the user;
presenting, by the at least one or more processors, a plurality of options for a second aspect of the product to the user;
permitting, by the at least one or more processors, each of the plurality of options for the first aspect of the product to be selected by the user; and
permitting, by the at least one or more processors, each of the plurality of options for the second aspect of the product to be selected by the user with each selection of the plurality of options for the first aspect of the product,
wherein the second aspect of the product is different than the first aspect of the product,
wherein the plurality of options for the first aspect and the plurality of options for the second aspect permit the user to customize the product, and
wherein at least one of the first aspect and the second aspect of the product relates to the corresponding segment of the predefined three-dimensional model of the product.

8. The method of claim 7, further comprising:
receiving, by the at least one or more processors, a first selection of at least one of the plurality of options for the first aspect of the product;
receiving, by the at least one or more processors, a second selection of at least one of the plurality of options for the second aspect of the product; and
determining, by the at least one or more processors, whether the product may be manufactured based on the first selection and the second selection.

9. The method of claim 8, further comprising:
determining, by the at least one or more processors, the updated price of the product based on the custom segment, the first selection, and the second selection.

10. The method of claim 9, further comprising:
permitting, by the at least one or more processors, a submission of the work order for the product.

11. The method of claim 10, further comprising:
generating, by the at least one or more processors, at least a bill of materials for the product based on the submission of the work order; and
sending, by the at least one or more processors, the bill of materials to the manufacturer.

12. The method of claim 1, wherein the correlation model is used for different users.

13. The method of claim 1, further comprising:
training the correlation model to correlate a custom segment of a plurality of segments of a three-dimensional model of a portion of a second body to the corresponding segment of the plurality of segments of the predefined three-dimensional model of the product in the raw state based on the adjusted metric,
wherein the custom segment of the three-dimensional model of the second body corresponds to the custom segment of the three-dimensional model of at least the portion of the body of the user.

14. A system, comprising:
a memory; and
at least one processor coupled to the memory and configured to:
receive, from a user device coupled to the system, a scan of a body of a user;
determine a body metric of the user based on the scan, wherein the body metric is related to a product provided by a manufacturing center;
generate a three-dimensional model of at least a portion of the body of the user comprising a first plurality of segments including at least one custom segment unique to the user related to an aspect of the product that is customizable and at least another segment related to an aspect of the product that is not customizable, the three-dimensional model of at least the portion of the body of the user being generated based on one or more anchor points of the body of the user related to the product;
compare the three-dimensional model of at least the portion of the body of the user to a predefined three-dimensional model of the product in a raw state comprising a second plurality of segments including a segment corresponding to the one custom segment of the three-dimensional model of at least the portion of the body of the user, wherein the three-dimensional model of at least the portion of the body of the user is generated by the at least one processor, and the predefined three-dimensional model of the product in the raw state is received from a computing device of the manufacturing center;
correlate the custom segment of the three-dimensional model of the portion of the body of the user to the corresponding segment of the predefined three-dimensional model of the product in the raw state using a correlation model that is unique to the product,
determine a difference between the custom segment of the three-dimensional model of the portion of the body of the user and the corresponding segment of the predefined three-dimensional model of the product based on the correlation model,
determine an adjusted metric for modifying the product in the raw state;
generate a modified three-dimensional model of the product based on the adjusted metric, wherein the modified three-dimensional model of the product is a current modified version of the product;
generate a work order for the manufacturing center based on the current modified version of the product; and
generate an updated price of the product based on the current modified version of the product.

15. The system of claim 14, wherein to generate the three-dimensional model of at least the portion of the body of the user, the at least one processor is configured to:
detect the one or more anchor points, and
generate the custom segment based on at least two of the one or more anchor points.

16. The system of claim 14,
wherein the modified three-dimensional model of the product comprises a plurality of segments, and wherein at least one of the plurality of segments of the modified three-dimensional model of the product corresponds to the adjusted metric, and the at least one processor is further configured to:
present the modified three-dimensional model of the product to the user.

17. The system of claim 16, the at least one processor further configured to:
receive a modification of the segment of the modified three-dimensional model of the product corresponding to the adjusted metric by the user, and
update the modified three-dimensional model of the product based on the modification of the segment.

18. The system of claim 14, wherein the correlation model is used for different users.

19. The system of claim 14, wherein to update the correlation model, the at least one processor is configured to:
train the correlation model to correlate the custom segment of the plurality of segments of a three-dimensional model of a second body to the corresponding segment of the plurality of segments of the predefined three-dimensional model of the product in the raw state based on the adjusted metric.

20. A non-transitory computer-readable device having instructions stored thereon that, when executed by at least one computing device, cause the at least one computing device to perform operations comprising:
receiving, from a user device coupled to the at least one computing device, a scan of a body of a user;
determining a body metric of the user based on the scan, wherein the body metric is related to a product provided by a manufacturing center;
generating a three-dimensional model of at least a portion of the body of the user comprising a first plurality of segments including at least one custom segment unique to the user related to an aspect of the product that is customizable and at least another segment related to an aspect of the product that is not customizable, the three-dimensional model of at least the portion the body of the user being generated based on one or more anchor points of the body of the user related to the product;
comparing the three-dimensional model of at least the portion of the body of the user to a predefined three-dimensional model of the product in a raw state comprising a second plurality of segments including a segment corresponding to the one custom segment of the three-dimensional model of at least the portion of the body of the user, wherein the three-dimensional model of at least the portion of the body of the user is generated by the computing device, and the predefined three-dimensional model of the product in the raw state is received from a computing device of the manufacturing center;
correlating the custom segment of the three-dimensional model of the portion of the body of the user to the corresponding segment of the predefined three-dimensional model of the product in the raw state using a correlation model that is unique to the product;
determining a difference between the custom segment of the three-dimensional model of the portion of the body of the user and the corresponding segment of the predefined three-dimensional model of the product in the raw state based on the correlation model;
determining an adjusted metric for modifying the product in the raw state;
generating a modified three-dimensional model of the product based on the adjusted metric, wherein the modified three-dimensional model of the product is a current modified version of the product;
generating a work order for the manufacturing center based on the current modified version of the product; and
generating an updated price of the product based on the current modified version of the product.

* * * * *